United States Patent [19]

Oskam et al.

[11] 4,080,049

[45] Mar. 21, 1978

[54] APPARATUS FOR ADJUSTING A MIRROR AROUND TWO MUTUALLY PERPENDICULAR AXES

[75] Inventors: Aane Adriaan Oskam, De Meern; Hermanus Marinus Ignatius Koot, Linschoten, both of Netherlands

[73] Assignee: Industrie Koot B.V., Industrieterrein De Hooge Waard, Montfoort, Netherlands

[21] Appl. No.: 732,292

[22] Filed: Oct. 14, 1976

[30] Foreign Application Priority Data

Oct. 16, 1975 Netherlands .......................... 7512132

[51] Int. Cl.² .......................... G02B 5/08; F16C 1/10; G05G 1/08
[52] U.S. Cl. .................................. 350/289; 74/501 M; 74/506; 318/468
[58] Field of Search ............. 350/289; 74/501 M, 506; 318/468

[56] References Cited

U.S. PATENT DOCUMENTS

| | | | |
|---|---|---|---|
| Re. 27,653 | 5/1973 | Oskam ................................. | 350/289 |
| 3,857,631 | 12/1974 | Morgenstern et al. .............. | 350/289 |

Primary Examiner—Jon W. Henry
Attorney, Agent, or Firm—Wenderoth, Lind & Ponack

[57] ABSTRACT

An apparatus for adjusting a mirror or a similar flat planar element around two mutually perpendicular axis. The apparatus has a mounting plate for mounting the mirror thereon, the mounting plate being connected to a support by means of a universal joint. On the support is mounted a single reversible electric motor and a transmission system having two planetary gear systems, each having a sun pinion wheel and planet wheels meshing with the sun wheel, the sun wheels of the planetary gear systems being disposed coaxially with the motor shaft. An electromagnetically controlled coupling selectively couples the motor to one or the other of the two pinion sun wheels. The transmission system is connected to the mounting plate of the mirror to be adjusted by means of a single string, the string engaging the mounting plate at mutually opposed points located thereon in pairs and being laid in a loop around the pulleys of said two planetary gear systems under spring tension, and being guided by guiding means to the points on the mounting plate.

4 Claims, 5 Drawing Figures

& nbsp;
APPARATUS FOR ADJUSTING A MIRROR AROUND TWO MUTUALLY PERPENDICULAR AXES This invention relates to an apparatus for adjusting a mirror or the like, particularly an outside mirror for an automobile, in azimuth and elevation around two mutually perpendicular axes.

BACKGROUND OF THE INVENTION AND PRIOR ART

There is presently known, as disclosed in U.S. Pat. Nos. Re 27,653 and 3,857,631, an outside rear view mirror for an automobile which is electrically adjustable by means of a remote control switch provided within the automobile. The apparatus has a mounting plate for mounting a mirror thereon, and the mounting plate is mounted on a support by means of a universal joint, so that the mounting plate can be adjusted around two mutually perpendicular axes relative to the support. On the support is provided a single reversible electric motor and a transmission system having two planetary gear transmissions, each having a sun pinion wheel and planet wheel meshed with the sun wheel. The sun wheels of the planetary gear systems are disposed coaxially with the motor shaft, and an electromagnetically controlled coupling selectively couples the motor to one or the other of the two pinion sun wheels. Pulleys are driven by the sun and planet wheel systems and are connected to the mounting plate for the mirror by two strings, one for each pulley, the strings being laid in a loop around the pulley, guided around guide pulleys, and connected to the mounting plate at mutually opposed points located on the mounting plate in pairs. One end of each string is held on the mounting plate by a spring, and the other end is connected directly to the mounting plate.

As pointed out above, this known apparatus has two tensioning springs and two strings, one for applying a force for achieving pivoting motion around each of the axes of rotation.

A disadvantage of this construction is that when constructing the apparatus, each string must be provided with a ferrule f.i. made of copper at both ends thereof, which ferrule has to be pinched onto the end of the string at exactly the correct position, and will be located in a cavity in the mounting plate or at the outer end of the respective spring.

Moreover, the active part of each of the strings must have exactly the correct length, which makes the assembly of the strings and mounting plate more difficult and time-consuming.

After the apparatus with the two strings and two springs has been assembled, it still has some other disadvantages. Among these are:

(1) The apparatus is direction-sensitive. This means that the forces for adjusting the mirror around one adjusting axis are not equal for adjustment in the opposite directions. This is true for mirror adjustments around each of the two adjusting axes. If one pushes first in the middle of one edge of the mounting plate, at which point one end of one string is directly fixed to said mounting plate, and thereafter in the middle of the opposite edge, at which point the other end of the one string is fixed to the outer end of the tensioning spring, the force which must be applied in the first instance for tilting the mounting plate is 1.5-2 times less than the force which must be applied in the second instance.

For adjusting the mirror or the mounting plate respectively in this way, the string must slip over one of the pulleys of the planetary gear systems. The less the smaller of the above two mentioned adjusting forces, the sooner the mirror mounted on a car will flutter or inadvertently take another position.

(2) The adjusting force in both directions decreases equally as the temperature falls to $-25°$ C, a temperature to which cars can be subjected in normal practice. In such a normal range of temperature conditions, at the low end of the range, the lower value adjusting force appears to be capable of decreasing to a value which is relatively near zero, indicating that the friction of the strings over the pulleys for one sense of adjustment has disappeared almost completely. In such a case, the adjusting apparatus is operative only in one direction around the adjusting axes.

OBJECTS AND BRIEF SUMMARY OF THE INVENTION

It is an object of the invention to provide an apparatus of the above-described type which overcomes these disadvantages.

This object is achieved by an apparatus of the above type according to the invention in which only one string is provided for adjusting the mirror in both directions, said string being maintained under tension by means of one spring and being fixed on the mounting plate at its two ends by pinching action of a cam-like member in a recess. Preferably said spring for tensioning the string is a coil spring located at a corner point of the mounting plate, the axis of said spring intersecting the mutually perpendicular edges of said mounting plate at an angle of about 45°.

At one end of the spring for tensioning the string is provided an element having a cylindrical protrusion extending into the spring, said element further comprising a curved grooved shoulder part for guiding the string, and a guiding tongue on the end of the element opposite said cylindrical protrusion, said guiding lip extending beyond said shoulder part, and said element being slidably located in a guiding slot in the mounting plate.

The advantages of the improved apparatus are that the assembly is considerably easier than for the prior art apparatus, the apparatus is not direction-sensitive, and it remains adjustable in both directions around each adjusting axis, even when subjected to low temperatures.

BRIEF DESCRIPTION OF THE FIGURES

The apparatus in accordance with the invention will now be described in detail, by way of example, with reference to the accompanying drawings, in which.

DETAILED DESCRIPTION OF THE PREFERRED EMBODIMENT

Figure 1:
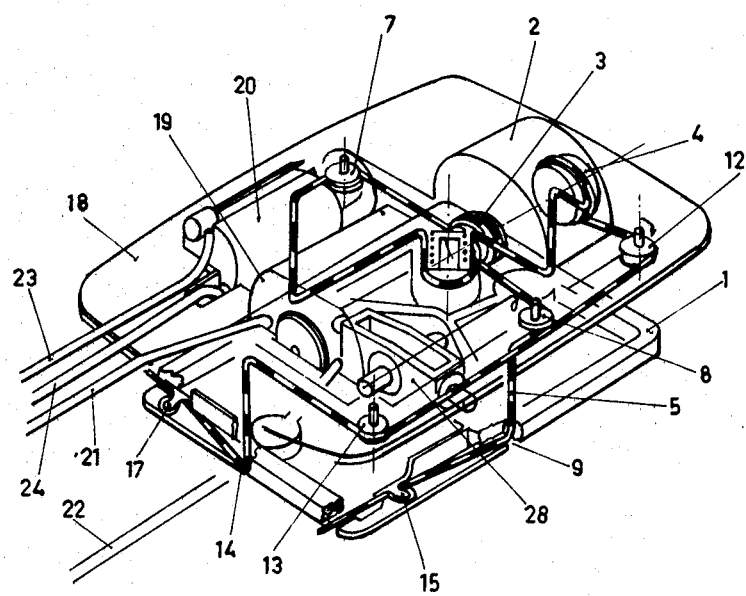
FIG. 1 is a partially schematic perspective view of the apparatus according to the invention, with some parts broken away.
Figure 2:
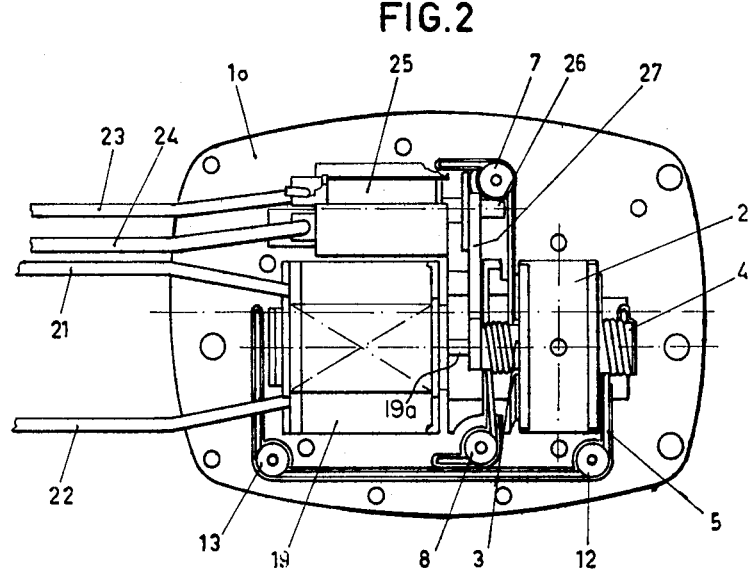
FIG. 2 is a top plan view of the apparatus as shown in FIG. 1.
Figure 3:
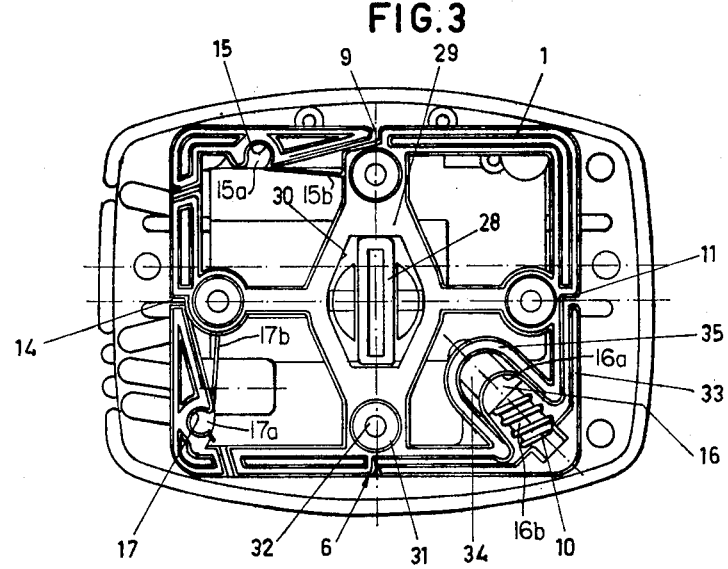
FIG. 3 is a bottom plan view of the device as shown in FIG. 1.

The apparatus according to the invention is shown in FIGS. 1-3, from which figures the relative positions of the parts can be seen, together with the path of the string. On a support 18 is mounted a reversible electric motor 19, a transmission system 2, and an electromagnetically controlled coupling generally indicated at 20 therebetween. The axis of the transmission system 2 is coaxial with the axis of said motor 19. The motor 19 is connected with a power source by means of the conductors 21 and 22 via a switch (not shown). The conductors for the coupling 20 are at 23 and 24.

The transmission system 2 is of the type as described in detail in connection with FIG. 6 in the abovementioned U.S. Pat. Nos. Re 27,653 and 3,857,631, and has a first and a second planetary transmission including a pulley 4 on one end constituting part of the first planetary gear transmission and a pulley 3 on the other end constituting part of the other planetary gear transmission. The coupling 20 comprises a coil 25, the shaft 26 of which moves to the left in FIG. 2 when the coil is energized. On the shaft 26 is disposed a fork 27, the outer end of which engages a disc (not visible), said disc being connected to a bearing (also not visible) extending into the transmission system 2. When energized, the coil 25 pulls said fork 27 to pull said bearing out of the transmission system, which causes the second planetary or first planetary gear transmission to be coupled with the motor shaft 19a, whereas the other or first planetary gear tansmission is coupled to the motor shaft 19a when the coil 25 is not energized, as is described in the abovementioned patents.

A mounting plate 1 is mounted on support 18 by means of a universal joint 28. As seen in FIG. 3, the plate mainly comprises a crosslike middle part 29 with a hollow casing 30 for receiving the universal joint 28. The crosslike part 29 further has four circular recesses 31 therein having openings 32 therein for mounting a mirror or the like (not shown) on the mounting plate 1. Around the crosslike member 29 is a rectangular surrounding edge 33 in which guide grooves for a string means constituted by a string 5 are disposed. In a guiding slot defined by an edge member 35 at one corner of the mounting plate 1 at 45° angle to the edges of the mounting plate 1 is slidably mounted a string tensioning element 16 having curved grooved shoulder 16a thereon and a guiding tongue 34 projecting from the element 16 through a guide slot (not visible) in the edge member 35. On the other end of element 16 is a spring retaining projection 16b on which is one end of a coil spring 10 having the other end seated in a recess in edge 33. The string grooves extend from a notch 6 at the midpoint of one of the longer sides of the mounting plate 1 to the guiding slot, and from the guiding slot to a notch 11 at the midpoint of one of the ends of the mounting plate. The surrounding edge 33 also has two circular recesses 15 and 17, respectively, adjacent notches 9 and 14, which in turn are opposite notches 6 and 11. String grooves (unnumbered) extend from the recesses 15 and 17 to notches 9 and 14. Correspondingly formed cams 15a and 17a are insertable into recesses 15 and 17 for retaining the ends of the string means constituted by a string 5 therein by a pinching action. The cams 15a and 17a can be provided on the ends of flexible arms 15b and 17b integrally formed with the plate 1. This is easily made by molding the plate in plastic.

The path of the string 5 along the plate 1 is as follows. From recess 15 the string follows a string groove in the edge 33 to notch 9, from which point the string 5 crosses to the support 18 to be coupled to pulley 3 thereon and around guide means in the form of guide pulleys 7 and 8. At notch 6 the string 5 arrives again at the mounting plate 1, follows the guide groove to the right, passes around the curved grooved shoulder 16a of element 16, and through a guide groove to notch 11, where the string crosses again the space between plate 1 and support 18. After being coupled to the other pulley 4, the string passes around guide means in the form of guide pulleys 12 and 13 and arrives at notch 14 and extends along the string groove and is fixed at recess 17.

Figure 4:
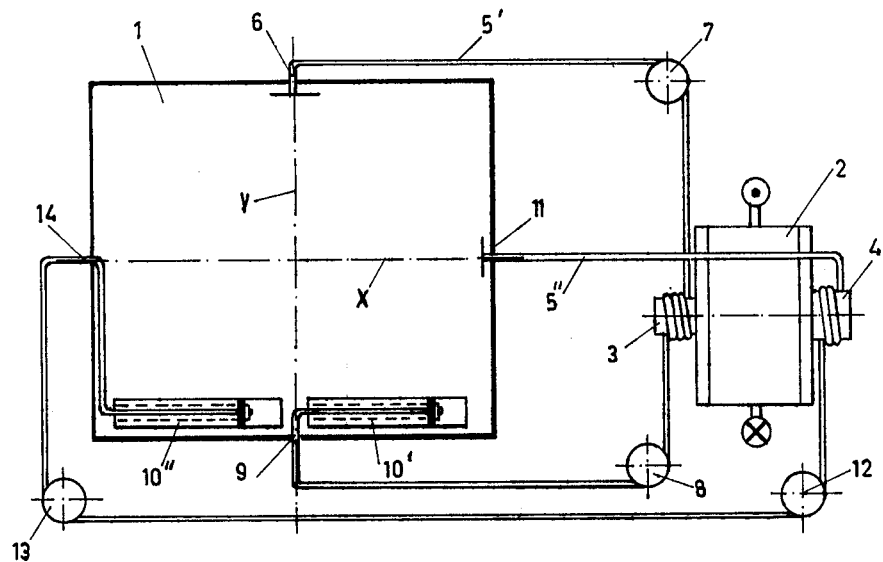
FIG. 4 is a schematic diagram of the arrangement of the strings in the prior art apparatus.
Figure 5:
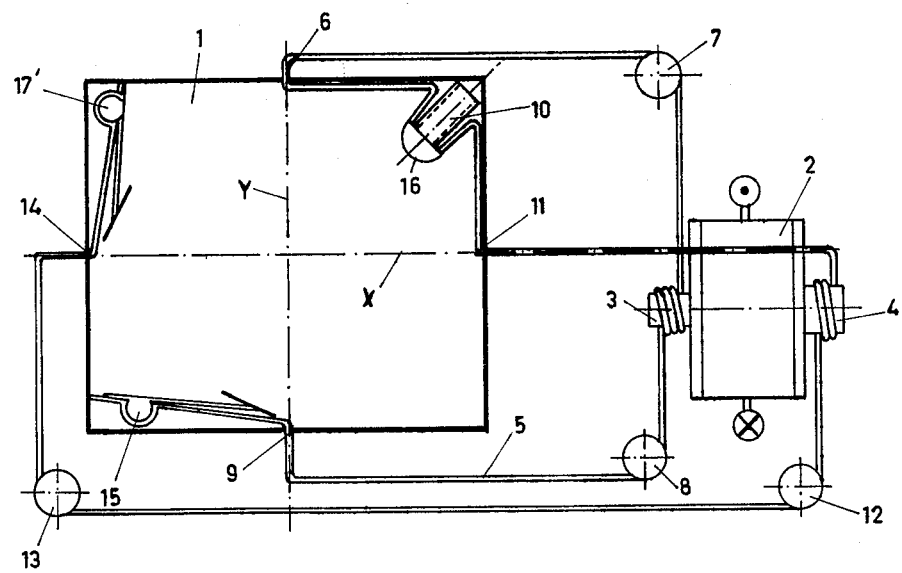
FIG. 5 is a schematic diagram of the arrangement of the one and only string in the apparatus according to the present invention.

The manner in which the present invention differs from the prior art as described above can be seen clearly from a comparison of FIGS. 4 and 5. In the device of U.S. Pat. Nos. Re 27,653 and 3,857,631, adjustment of the mirror around the horizontal X-axis, as shown in FIG. 4, is achieved by the first string 5', which is fixed in the plate 1 at point 6. The string 5' goes from the point 6 over the guide pulley 7 to the pulley 3, is then laid several times around said pulley 3 and goes back to the plate 1 at point 9 via the guide pulley 8. The end of the string 5' is fixed at the outer end of the spring 10' which lies in a recess in plate 1. A second string 5" serves for the adjustment of the mirror around the Y-axis and passes, similarly to the string 5', from the fixed point 11 via the pulley 4 and the guide pulleys 12 and 13 to the point 4 on the plate 1. The end of the string 5" is fixed at the outer end of the spring 10" in a recess in plate 1.

In the device of the present invention, shown in FIG. 5, in which parts corresponding to those in FIGS. 1-3 are indicated by the same reference numbers, the single string 5 is fixed in the plate 1 by the pinching action of the circular cam 15a which is pushed into the recess 15 and then passes via notch 9 to the guide pulley 8, around the pulley 3, over the guide pulley 7 to the notch 6 in the plate 1, around the element 16 at the outer end of the spring 10 to notch 11 in plate 1, and further around the pulley 4, over the guide pulleys 12 and 13 to notch 14, where the string 5 is fixed by means of a cam 17 in the corresponding recess 17 in the plate 1.

Experiments with the construction according to FIG. 4 have shown that the adjusting moment for rotating the mirror around the X- or Y-axis is about 11,500 g.cm as an average, when the pulling force is exerted at the points 6 or 11, respectively, of the plate 1. This force is directed perpendicular to the plane of drawing and points backwards. For an adjustment of the mirror by exerting a corresponding force at the points 9 or 14, respectively, an adjusting moment of about 6,000 g.cm as an average was found to be necessary, with a spring constant of 500 g./cm for the springs 10' and 10".

When carrying out the same measurements at a temperature of $-25°$ C, the above-mentioned values decrease from 11,500 and 6,000 g.cm to 8,500 and 2,200 g.cm. respectively. The latter value shows that the frictional force of the strings 5' and 5" over the pulleys 3 and 4 at that temperature becomes almost 0. When trying to adjust the mirror by driving the transmission system 2, the frictional force is found to be too small to be capable of adjusting the mirror.

It is possible to increase the lower values of 6,000 and 2,200 g.cm. respectively, by increasing the spring stiffness of the springs 10' and 10". By such measure, however, the tension of the strings 5' and 5" is increased over their whole length, resulting in an increase in the friction of the strings 5' and 5" on the pulleys 3 and 4 with an increase of the values 11,500 and 8,000 g.cm. This causes the disadvantage that the drive system, mainly comprising the drive motor and the transmission system 2, has to be built heavier and therefore bigger, to be capable of resisting the forces which can be applied to the drive system by way of the mirror or the mounting plate 1, respectively.

With the construction according to the present invention, this difference in the adjusting moment is almost completely eliminated. When exerting a force by the string 5 at the points 6 and 11, respectively, which are closest to the spring 10, the adjusting moment is only 10% less than when the adjusting force is exerted at the "fixed" points 9 and 14.

The advantage of having the spring 10 disposed as described above is that by the exertion of a force produced by a spring constant of 1000 g.cm on both parts of the string 5 with the string in the rest condition, exactly the same forces are exerted as if each part was independently tensioned by a spring with a spring constant of 500 g./cm. When exerting a force on the points 9 and 14, the adjusting moment is not increased over that required in the prior art device. However, when forces are exerted on the points 11 and 6, since only one part of the string 5 is put under tension, the spring 10 then initially has about the same influence as a spring 10' or 10" with a spring constant of 1000 g./cm instead of only 500 g./cm. The adjusting moment, which in the prior art construction is 1.5 – 2 times smaller than the moment for adjustment at points 9 and 14, now becomes almost the same as the adjusting moment required at points 9 and 14. The directional sensitivity of the adjusting moment has thus been cured, yet the drive motor and transmission system can remain the same size as in the prior art device and will operate to adjust the mirror in all directions, even at low temperatures.

Moreover, since the two strings 5' and 5" and the two springs 10' and 10" have been replaced by a single string 5, and a single spring 10, the cost of the parts for the device is reduced and the labor involved in assembling the device is reduced thus reducing the overall cost of the device.

What is claimed is:

1. In combination a mirror means, a support, a universal joint on the support, the mirror means being mounted on the universal joint, an adjusting means for azimuth and elevation adjustment of the mirror means and comprising a single reversible electric motor on the support and having a shaft, transmission means constituted by two planetary transmissions on the support each having a sun pinion wheel and planet wheels meshed with said sun wheels, and an output pulley, the sun wheels of said planetary transmissions being disposed coaxially with said motor axis, an electromagnetically controlled coupling for optionally coupling said shaft with one of said two pinion wheels, string means around said pulleys and coupled to said mirror means, and guide means for guiding said string from said pulleys to said mirror means, the transmission means being capable of acting on said mirror means for rotating said mirror means on said universal joint about two different axes, said string means being constituted by a single string having one end engaged at one point on said mirror means, extending around the pulley of one transmission and engaging said mirror means at an opposite point to said one point, extending to a second point on said mirror means, extending from said second point around the pulley of said other transmission and being engaged on said mirror means at an opposite point to said second point, the line connecting the first point and the point opposite thereto and the second point and the point opposite thereto being substantially perpendicular to each other, and a single spring on said mirror means engaging said string between said point opposite said first point and said second point for exerting tension on said string.

2. The combination as claimed in claim 1 further comprising a mounting plate forming part of said mirror means and on which the mirror is mounted, said string being engaged with said mounting plate, said mounting plate being substantially rectangular and said one point and the point opposite thereto being at the midpoints of one pair of opposite sides of said mounting plate and the second point and the point opposite thereto being at the midpoints of the other pair of opposite sides of said mounting plate, and said string extending along the edge of said mounting plate from said point opposite said one plate to said second point, and said spring being mounted on said plate at the corner of said mounting plate between said point opposite said one point and said second point and at an angle of about 45° to the intersecting sides of said mounting plate.

3. The combination as claimed in claim 2 in which said mounting plate has a guiding slot therein in which said spring is positioned, a string tensioning element slidably mounted in said guiding slot and urged inwardly of the peripheral edge of said mounting plate by said spring, said string tensioning element having a curved shoulder thereon facing inwardly of the periphery of said mounting plate over which said string is guided.

4. The combination as claimed in claim 2 in which said mounting plate has a recess therein adjacent said first point and said point opposite said second point, and further has cam members engagable in said recesses and pinching the ends of said string in said recesses for securing said string to said mounting plate, and flexible arms attached to said mounting plate and having said cam members on the free ends thereof.

* * * * *